US010897687B2

(12) United States Patent
Kwon et al.

(10) Patent No.: US 10,897,687 B2
(45) Date of Patent: Jan. 19, 2021

(54) ELECTRONIC DEVICE AND METHOD FOR IDENTIFYING LOCATION BY ELECTRONIC DEVICE

(71) Applicants: Samsung Electronics Co., Ltd., Suwon-si (KR); INDUSTRY-ACADEMIC COOPERATION FOUNDATION, YONSEI UNIVERSITY, Seoul (KR)

(72) Inventors: Taejun Kwon, Suwon-si (KR); Seongil Hahm, Suwon-si (KR); Jonghoon Shin, Seoul (KR); Kyoungwoo Lee, Seoul (KR); Hyunchoong Kim, Seoul (KR)

(73) Assignees: Samsung Electronics Co., Ltd., Suwon-si (KR); INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 0 days.

(21) Appl. No.: 16/566,058

(22) Filed: Sep. 10, 2019

(65) Prior Publication Data

US 2020/0084574 A1  Mar. 12, 2020

(30) Foreign Application Priority Data

Sep. 10, 2018 (KR) .................. 10-2018-0107910

(51) Int. Cl.
*H04W 4/02* (2018.01)
*H04W 4/029* (2018.01)
*H04W 4/021* (2018.01)
*H04W 4/33* (2018.01)
(Continued)

(52) U.S. Cl.
CPC ........... *H04W 4/023* (2013.01); *G01S 5/0263* (2013.01); *G01S 5/14* (2013.01); *G01S 19/03* (2013.01);
(Continued)

(58) Field of Classification Search
CPC ..... H04W 4/023; H04W 4/021; H04W 4/029; H04W 4/33; G01S 5/14; G01S 19/48; G01S 5/0263; G01S 19/03
(Continued)

(56) References Cited

U.S. PATENT DOCUMENTS

2012/0158297 A1  6/2012  Kim et al.
2013/0003572 A1  1/2013  Kim et al.
(Continued)

FOREIGN PATENT DOCUMENTS

KR  10-0994840 B1  11/2010
KR  10-1744723 B1  6/2017
(Continued)

OTHER PUBLICATIONS

International Search report dated Dec. 27, 2019, issued in International Patent Application No. PCT/KR2019/011741.

*Primary Examiner* — Inder P Mehra
(74) *Attorney, Agent, or Firm* — Jefferson IP Law, LLP

(57) ABSTRACT

An electronic device and a method for identifying a location by the electronic device are provided. The electronic device includes a display, a processor electrically connected with the display and a memory, and the memory storing instructions executed by the processor. The processor is configured to obtain a plurality of locations in a space-of-interest, detect a wireless signal from at least one external electronic device located in the space-of-interest or an adjacent area, obtain detection frequency data according to a frequency of detection of the wireless signal, and identify a current location of the electronic device based on at least part of the obtained detection frequency data.

18 Claims, 10 Drawing Sheets

(51) Int. Cl.
   *G01S 5/14*   (2006.01)
   *G01S 5/02*   (2010.01)
   *G01S 19/03*  (2010.01)
   *G01S 19/48*  (2010.01)
(52) U.S. Cl.
   CPC ............ *G01S 19/48* (2013.01); *H04W 4/021* (2013.01); *H04W 4/029* (2018.02)
(58) Field of Classification Search
   USPC ..................................................... 455/456.1
   See application file for complete search history.

(56) References Cited

U.S. PATENT DOCUMENTS

| | | | |
|---|---|---|---|
| 2013/0293416 A1* | 11/2013 | Waters .................... | G01S 19/48 342/357.31 |
| 2015/0153180 A1 | 6/2015 | Ettinger et al. | |
| 2016/0142883 A1* | 5/2016 | Zou ....................... | H04W 48/16 455/456.1 |
| 2016/0241998 A1 | 8/2016 | Choi et al. | |
| 2017/0006430 A1 | 1/2017 | Chao et al. | |
| 2017/0078851 A1* | 3/2017 | Agrawal ............... | H04W 64/00 |
| 2017/0251338 A1 | 8/2017 | Huberman et al. | |
| 2017/0359697 A1* | 12/2017 | Bhatti ....................... | G01S 5/14 |
| 2018/0165468 A1 | 6/2018 | Moon et al. | |
| 2018/0374355 A1* | 12/2018 | Hosokawa ............ | G06F 16/489 |
| 2019/0049552 A1* | 2/2019 | Chu ....................... | G08G 1/005 |

FOREIGN PATENT DOCUMENTS

| | | |
|---|---|---|
| KR | 10-2018-0026406 A | 3/2018 |
| KR | 10-1850332 B1 | 4/2018 |
| KR | 10-2018-0067139 A | 6/2018 |

* cited by examiner

|  | $P_1$ | $P_2$ | $P_3$ | $P_4$ | $P_5$ | $P_6$ |
|---|---|---|---|---|---|---|
| $AP_1$ | 30 | 30 | 15 | 10 | 20 | 15 |
| $AP_2$ | 1 | 5 | 3 | 17 | 10 | 1 |
| $AP_3$ | 10 | 5 | 0 | 0 | 0 | 15 |
| $AP_4$ | 1 | 0 | 0 | 0 | 1 | 0 |

FIG.6

ELECTRONIC DEVICE AND METHOD FOR IDENTIFYING LOCATION BY ELECTRONIC DEVICE

CROSS-REFERENCE TO RELATED APPLICATION(S)

This application is based on and claims priority under 35 U.S.C. § 119(a) of a Korean Patent Application number 10-2018-0107910, filed on Sep. 10, 2018, in the Korean Intellectual Property Office, the disclosure of which is incorporated by reference herein in its entirety.

BACKGROUND

1. Field

The disclosure relates to electronic devices and methods for identifying a location by an electronic device.

2. Description of Related Art

Recent advances in communication technology and the spread of the Internet of things (IoT) are leading to growth of smart home environments, and there are ongoing research efforts in technology for perceiving users' context by analyzing many types of sensor data as a method for identifying the indoor location of a user and providing the user with services suited for the context. Smart home environments may offer various IoT-based services and allow user context to be recognized by a diversity of IoT devices.

Locating or positioning techniques using short-range wireless communication (e.g., Wi-Fi) come largely in two types: triangulation and fingerprinting.

Triangulation, a representative positioning scheme, measures signal strengths (e.g., received signal strength (RSS)) from three or more access points (APs), convert the signal strengths into a distance, and applies the distance to a simple equation to thereby calculate the location. Triangulation, however, presents poor positioning results in indoor space.

Fingerprinting splits an indoor space into small cells, gathers RSSs directly from the cells, creates a database and builds up a radio map, then compares the database with the RSS received from the user's location, and estimates the cell, which gives the closest signal pattern, as the user's location. By manually gathering data reflecting the properties of space, fingerprinting is much more accurate than triangulation and presents more accuracy as the wireless network environment gets better and the database is created with more dense data. Despite such merits, fingerprinting disadvantageously consumes lots of loads and time in computation for positioning the user.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device and method for identifying the current location of an electronic device in an indoor space.

Additional aspects will be set forth in part in the description which follows and, in part, will be apparent from the description, or may be learned by practice of the presented embodiments.

In accordance with an aspect of the disclosure, an electronic device is provided. The electronic device includes a display, a memory, and a processor electrically connected with the display and the memory, wherein the processor is configured to obtain a plurality of locations in a space-of-interest, detect a wireless signal from at least one external electronic device located in the space-of-interest or an adjacent area, obtain detection frequency data according to a frequency of detection of the wireless signal, and identify a current location of the electronic device based on at least part of the obtained detection frequency data.

In accordance with another aspect of the disclosure, a method for identifying a location by an electronic device is provided. The method includes obtaining a plurality of locations in a space-of-interest, detecting a wireless signal from at least one external electronic device located in the space-of-interest or an adjacent area, obtaining detection frequency data according to a frequency of detection of the wireless signal, and identifying a current location of the electronic device based on at least part of the obtained detection frequency data.

In accordance with another aspect of the disclosure, an electronic device is provided. The electronic device includes a communication interface configured to communicate with a first electronic device, a memory, and a processor connected with the communication interface and the memory, wherein the processor may be configured to obtain a plurality of locations in a space-of-interest, receive, from the first electronic device, detection frequency data for a wireless signal received from at least one external electronic device adjacent to the first electronic device, identify a current location of the first electronic device based on at least part of the received detection frequency data, and perform an operation related to the identified current location.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 6 is a view illustrating example reference data according to an embodiment of the disclosure;

Throughout the drawings, like reference numerals will be understood to refer to like parts, components, and structures.

DETAILED DESCRIPTION

Figure 1:
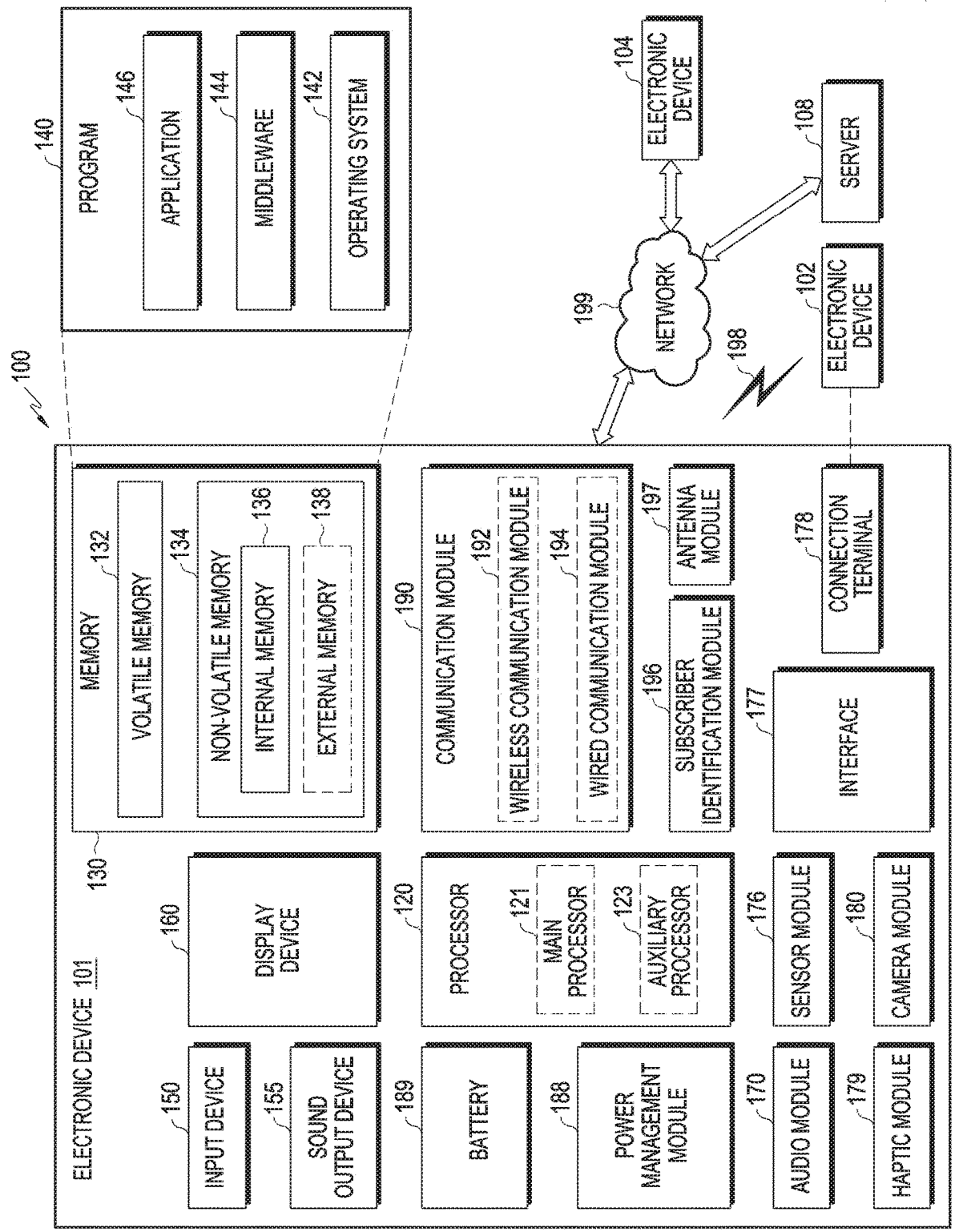
FIG. 1 is a view illustrating a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the terms "have," "may have," "include," or "may include" a feature (e.g., a number, function, operation, or a component such as a part) indicate the existence of the feature and do not exclude the existence of other features.

As used herein, the terms "A or B," "at least one of A and/or B," or "one or more of A and/or B" may include all possible combinations of A and B. For example, "A or B," "at least one of A and B," "at least one of A or B" may indicate all of (1) including at least one A, (2) including at least one B, or (3) including at least one A and at least one B.

As used herein, the terms "first" and "second" may modify various components regardless of importance and do not limit the components. These terms are only used to distinguish one component from another. For example, a first user device and a second user device may indicate different user devices from each other regardless of the order or importance of the devices. For example, a first component may be denoted a second component, and vice versa without departing from the scope of the disclosure.

It will be understood that when an element (e.g., a first element) is referred to as being (operatively or communicatively) "coupled with/to," or "connected with/to" another element (e.g., a second element), it can be coupled or connected with/to the other element directly or via a third element. In contrast, it will be understood that when an element (e.g., a first element) is referred to as being "directly coupled with/to" or "directly connected with/to" another element (e.g., a second element), no other element (e.g., a third element) intervenes between the element and the other element.

As used herein, the terms "configured (or set) to" may be interchangeably used with the terms "suitable for," "having the capacity to," "designed to," "adapted to," "made to," or "capable of" depending on circumstances. The term "configured (or set) to" does not essentially mean "specifically designed in hardware to." Rather, the term "configured to" may mean that a device can perform an operation together with another device or parts. For example, the term "processor configured (or set) to perform A, B, and C" may mean a generic-purpose processor (e.g., a CPU or application processor) that may perform the operations by executing one or more software programs stored in a memory device or a dedicated processor (e.g., an embedded processor) for performing the operations.

The terms as used herein are provided merely to describe some embodiments thereof, but not to limit the scope of other embodiments of the disclosure. It is to be understood that the singular forms "a," "an," and "the" include plural references unless the context clearly dictates otherwise. All terms including technical and scientific terms used herein have the same meaning as commonly understood by one of ordinary skill in the art to which the embodiments of the disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein. In some cases, the terms defined herein may be interpreted to exclude embodiments of the disclosure.

Examples of the electronic device may include at least one of a smartphone, a tablet personal computer (PC), a mobile phone, a video phone, an e-book reader, a desktop PC, a laptop computer, a netbook computer, a workstation, a PDA (personal digital assistant), a portable multimedia player (PMP), an MP3 player, a mobile medical device, a camera, or a wearable device (e.g., smart glasses, a head-mounted device (HMD), electronic clothes, an electronic bracelet, an electronic necklace, an electronic appcessory, an electronic tattoo, a smart mirror, or a smart watch).

According to an embodiment of the disclosure, the electronic device may be a smart home appliance. Examples of the smart home appliance may include at least one of a television, a digital video disk (DVD) player, an audio player, a refrigerator, an air conditioner, a cleaner, an oven, a microwave oven, a washer, a dryer, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to other embodiments, examples of the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning satellite (GPS) receiver, an event data recorder (EDR), a flight data recorder (FDR), an automotive infotainment device, a sailing electronic device (e.g., a sailing navigation device or a gyro compass), avionics, security devices, vehicular head units, industrial or home robots, automatic teller's machines (ATMs), point of sales (POS) devices, or Internet of things (IoT) devices (e.g., a bulb, various sensors, an electric or gas meter, a sprinkler, a fire alarm, a thermostat, a street light, a toaster, fitness equipment, a hot water tank, a heater, or a boiler).

According to some embodiments, examples of the electronic device may at least one of part of a piece of furniture or a building/structure, an electronic board, an electronic signature receiving device, a projector, or various measurement devices (e.g., devices for measuring water, electricity, gas, or electromagnetic waves). According to various embodiments, the electronic device may be one or a combination of the above-listed devices. According to some embodiments, the electronic device may be a flexible electronic device. The electronic device disclosed herein is not limited to the above-listed devices, and may include new electronic devices depending on the development of technology.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134, such as internal memory 136 and external memory 138. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing recordings, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and support a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

A first electronic device is described below with reference to the accompanying drawings, according to an embodiment.

As used herein, 'space-of-interest' may refer to an indoor space where the first electronic device is located, and 'detection frequency data' may denote the frequency of detection of wireless signals received from at least one external electronic device in a plurality of locations into which the space-of-interest is divided. The frequency of detection may denote the frequency in which signal strengths of wireless signals received from at least one external device located around the first electronic device are detected in a preset signal strength or more. As used herein, 'reference data' may refer to data preset based on the detection frequency data for wireless signals received from at least one external device and may be used to identify the current location of the first electronic device. The reference data may be stored in a database in the form of a data table or map.

Figure 2:
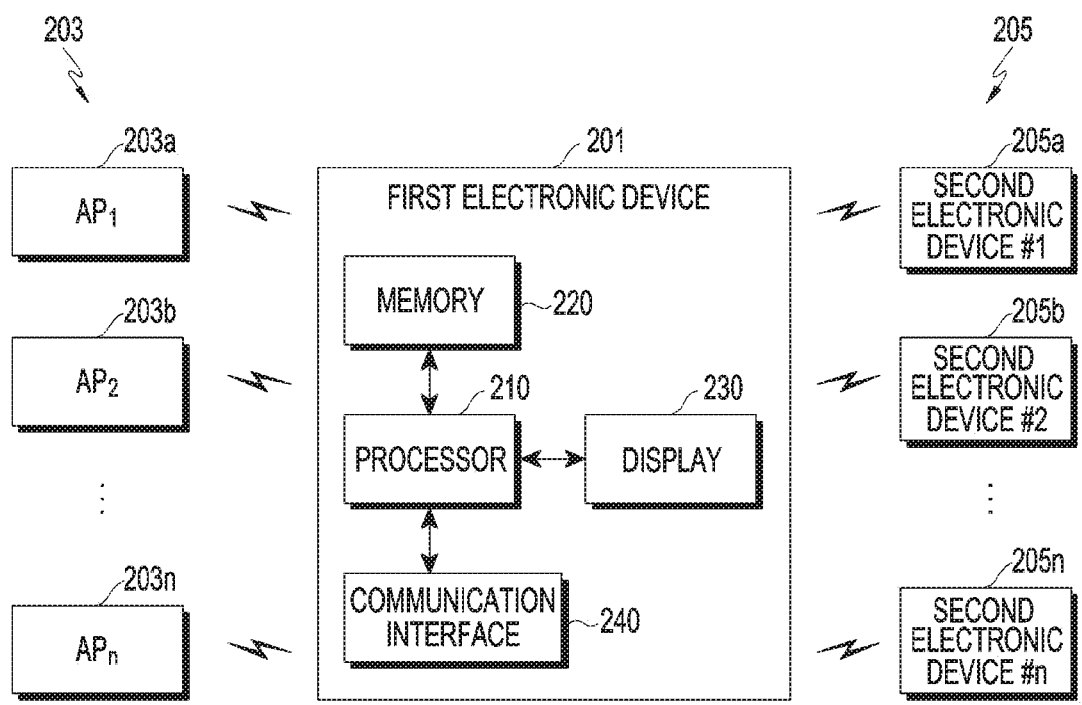
FIG. 2 is a view illustrating an example configuration of a first electronic device according to an embodiment of the disclosure.

FIG. 2 is a view illustrating an example configuration of a first electronic device according to an embodiment of the disclosure.

Referring to FIG. 2, according to an embodiment, a first electronic device 201 (which is the same or similar to the electronic device 101 of FIG. 1) may include at least one of a processor 210, a memory 220, a display 230, and a communication interface 240. The first electronic device 201 may perform communication with neighboring external electronic devices 203 and 205 via a short-range wireless communication network (e.g., wireless-fidelity (Wi-Fi) or near-field communication (NFC)).

According to an embodiment, the processor 210 (e.g., the processor 120 of FIG. 1) may process information according to an operation of the electronic device or information according to execution of a program, an application, or a function, and the processor 210 may perform control to display the processed information on the display unit 230 or output the processed information through an audio module (not shown) or vibration module (not shown).

According to an embodiment, the processor 210 may perform control to perform short-range wireless communication with external electronic devices in the space-of-interest or adjacent areas, e.g., at least one access point 203, 203a, 203b, . . . , 203n and second electronic devices (e.g., IoT devices, wearable devices, or other communicable electronic devices) 205, 205a, 205b, . . . , 205n and perform control to transmit/receive data with at least one external electronic device 203 and 205 connected via short-range wireless communication.

According to an embodiment, the processor 210 may be configured to, before obtaining a plurality of locations in the space-of-interest as per a request for identifying the current location of the first electronic device 201, generate reference data used for identifying the candidate location in each of the plurality of locations and control the memory to previously store the generated reference data in a database of the memory 220. Upon generating the reference data, the processor 210 may set the space-of-interest and the plurality of locations to be identified in the space-of-interest and generate a map for the space-of-interest using the plurality of set locations. Upon generating the reference data, the processor 210 may detect a wireless signal from the at least one external electronic device 203 and 205 in each of the plurality of locations during a preset time, obtain detection frequency data for the detected wireless signal, and generate the reference data using the obtained detection frequency data and the generated map. The reference data for each location may include identification information about the at least one external electronic device 203 and 205, the detection frequency data, and location identification information.

According to an embodiment, the processor 210 may arrange areas (e.g., a living room, kitchen, bedroom, bathroom, and multi-purpose room) into which the space-of-interest is divided by the user according to the properties of the space-of-interest in a virtual space (e.g., an indoor floor plan) corresponding to the space-of-interest, thereby generating a map (e.g., a detection frequency map) for the space-of-interest. The processor 210 may obtain detection frequency data for at least one wireless signal received from each of the areas arranged on the generated map, map the obtained detection frequency data, as reference data, to the generated map, and control the memory 220 to previously store the resultant map in the database of the memory 220.

According to an embodiment, the processor 210 may set a plurality of locations more accurately bordered, for the areas into which the space-of-interest has been divided by the user, based on the obtained detection frequency data. For example, the processor 210 may accurately divide the areas of the space-of-interest into a kitchen (e.g., identification code 001), a living room (e.g., identification code 002), a bedroom (e.g., identification code 003), a midway area (e.g., identification code 004) between the kitchen and the living room, a midway area (e.g., identification code 005) between the living room and the bedroom, a midway area (e.g., identification code 006) between the kitchen and the bedroom, and a midway area (e.g., identification code 006) between the kitchen, living room, and bedroom, according to deviations in detection frequency of the wireless signals received from the plurality of access points 203. Here, the detection frequency data for the wireless signal may be obtained by the frequency of detection or the probability of discovery of the wireless signal received from at least one access point (AP) detected in the operation of scanning wireless signals (e.g., Wi-Fi) performed by the first electronic device 201 during a preset time. The frequency of detection of the wireless signal may not always be discovered under some wireless contexts in a certain location. Thus, the cells formed to overlap each other by the plurality of access points may be split more delicately to be used to clearly differentiate the plurality of locations.

According to an embodiment, the processor 210 may split the space-of-interest into preset unit areas, obtain detection frequency data for the wireless signal detected from the at least one external electronic device in each of the unit areas, and differentiate the plurality of locations based on the obtained detection frequency data.

According to an embodiment, the plurality of identifiable locations may be previously divided into by the user in which case the processor 210 may differentiate the plurality of locations by identifying the overlap of the plurality of locations, grouping similar locations, or performing density-based clustering in the generated map based on the detection frequency data for the wireless signal. The overlap identification may be performed to identify whether two or more locations divided into by the user are identical to each other.

According to an embodiment, the processor 210 may be configured to identify a plurality of locations preset in the space-of-interest at a request for identifying the location of the first electronic device 201 or when an event occurs. The processor 210 may detect a wireless signal from at least one external electronic device located in the space-of-interest or an adjacent area during a preset time. The detection frequency data may refer to the frequency or probability of detection of at least one external electronic device via wireless signal scanning or detection during the preset time. The wireless signal may be a beacon signal or discovery signal transmitted from at least one access point 203 located in the space-of-interest or adjacent area via wireless signal scanning which is periodically performed or a wireless signal received from the second electronic device 205 located adjacent in the space-of-interest.

According to an embodiment, the processor 210 may be configured to identify at least one candidate location among the plurality of particular locations based on at least part of the obtained detection frequency data and identify the current location of the first electronic device 201 based on the at least one identified candidate location. The processor 210 may be configured to identify the current location of the first electronic device 201 based on the at least one identified candidate location.

According to an embodiment, the processor 210 may select at least one location having a similar ratio to the detection frequency ratio between detection frequency data pieces for the wireless signals detected from the at least one external electronic device 203 and 205 in the detection frequency map and identify the at least one selected location as the candidate location. According to an embodiment, unless no identifiable location corresponding to the similar ratio is selected, the processor 210 may determine that an identifiable location adjacent to the prior identifiable location of the first electronic device 201 is the at least one candidate location.

According to an embodiment, if a single candidate location is determined, the processor 210 may determine that the determined candidate location is the final location. According to an embodiment, if a plurality of candidate locations is determined, the processor 210 may obtain similarities between the wireless communication fingerprint of the electronic device 201 and each determined candidate location and identify the candidate location with the highest similarity among the candidate locations as the final location. According to an embodiment, if there are identified at least two candidate locations physically adjacent to each other based on the obtained similarities, the processor 210 may identify that the midway location between the areas formed by the two identified candidate locations is the final location.

According to an embodiment, if the final location is determined, the processor 210 may be configured to update pre-stored reference data based on the detection frequency data for the wireless signal from the at least one particular access point.

According to an embodiment, the processor 210 may be configured to control the display 230 to display, on the screen of the display 230, the generated map which visually represents the plurality of locations and the at least one candidate location identified in the space-of-interest. If the current location of the first electronic device 201 is identified, the processor 210 may be configured to control the display 230 to display, on the screen of the display 230, the map, with the identified current location placed on the generated map.

According to an embodiment, upon grouping particular locations to differentiate the plurality of identifiable locations, the first electronic device 201 may identify the locations more precisely by increasing the number of the particular locations or less precisely by decreasing the number of the particular locations. For example, the processor 210 may obtain the detection frequency data for the wireless signal detected in each location by splitting the space in a fixed proportion (e.g., splitting the entire space in mesh of 1-m units) and differentiate the plurality of locations by grouping locations with similar ratios to the obtained detection frequency data.

According to an embodiment, the processor 210 may put the detection frequency of each of the plurality of locations in the dimension determined through the plurality of access points 203. For example, in a case where the number of the access points 203 is three, e.g., first to third access points 203a, 203b, and 203c, the processor 210 may arrange the detection frequencies in three dimensions in which the first to third access points 203a, 203b, and 203c are set as axes. The processor 210 may differentiate the plurality of locations by performing density-based space clustering on the detection frequencies arranged in three dimensions. Density-based space clustering corresponds to grouping locations with similar detection frequencies into one space based on the plurality of access points 203a, 203b, and 203c, which have been obtained from the plurality of particular locations, and the dimension of grouping may be determined depending on the number of the access points.

According to an embodiment, the processor 210 may identify candidate locations based on the detection frequency data and, for more accurate identification of the final location, use a wireless communication fingerprinting scheme to identify the final location which indicates the current location of the first electronic device 201 among the identified candidate locations.

According to an embodiment, the processor 210 may receive information about the wireless communication fingerprint obtained based on the detected wireless signal and identify candidate locations based on the received wireless communication fingerprint information. The processor 210 may identify the final location of the first electronic device 201 among the candidate locations identified based on the detection frequency data.

According to an embodiment of the disclosure, the processor 210, which may be a hardware module or software module (e.g., an application program), may be a hardware component (function) or software component (program) including at least one of various sensors, data measuring module, input/output interface, a module for managing the state or environment of the electronic device, or communication module as included in the electronic device.

According to an embodiment of the disclosure, the processor 210 may include one of, e.g., hardware, software, or firmware, or a combination of two or more thereof. According to an embodiment of the disclosure, the processor 210 may lack at least some of the components or may include other components for performing an image processing operation in addition to the components.

According to an embodiment of the disclosure, the memory 220 (e.g., the memory 130 of FIG. 1) of the electronic device may temporarily store various data generated while the program runs, as well as a program necessary for a functional operation according to an embodiment. The memory 220 may largely include a program area and a data area. The program area may store relevant information for driving the electronic device, such as operating system (OS) for booting up the electronic device. The data area may store data communicated and generated according to an embodiment of the disclosure. Further, the memory 220 may include at least one storage medium of a flash memory, a hard disk, a multimedia card, a micro-type memory (e.g., a secure digital (SD) or an extreme digital (xD) memory), a random access memory (RAM), or a read only memory (ROM).

According to an embodiment, the memory 220 may store information for short-range wireless communication with at least one external electronic device 203 and 205 and data transmitted and received.

According to an embodiment, the memory 220 may store information about a preset space-of-interest and a plurality of locations in the space-of-interest, and the memory 220 may store information related to a map for the space-of-interest, which is generated based on the plurality of set locations. The memory 220 may store wireless signals received from at least one external electronic device and detection frequency data for the detected wireless signals. The memory 220 may include a database pre-storing reference data generated based on the detection frequency data.

According to an embodiment, if the current location of the first electronic device 201 is identified, the memory 220 may be configured to update the pre-stored reference data based on the detection frequency data for the detected wireless signal upon performing the operation for identifying the location of the first electronic device 201. If the current location of the first electronic device 201 is identified, the memory 220 may store the identified current location.

According to an embodiment of the disclosure, the display 230 (e.g., a partial configuration of the input device 150 or display 160 of FIG. 1) may output information on a result of running an operation (e.g., at least one of text, image, or video) under the control of the processor 210.

According to an embodiment, the display 230 may display a map which visually represents a virtual space corresponding to the space-of-interest and may visually represent candidate locations identified by the processor 210 on the map. If the current location of the first electronic device 201 is identified by the processor 210, the display 230 may visually represent the identified current location on the map. If an application for identifying locations is executed, the display 230 may display information related to the executed application on the screen.

According to an embodiment of the disclosure, the display 230, when implemented in the form of a touchscreen, may correspond to the touchscreen of an input interface (not shown). The display 230, when implemented together with the input interface in the form of a touchscreen, may display various information generated according to the user's touch operation.

According to an embodiment of the disclosure, the display 230 may include at least one or more of a liquid crystal display (LCD), a thin film transistor LCD (TFT-LCD), an organic light emitting diode (OLED) display, a light emitting diode (LED) display, an active matrix OLED (AMOLED) display, a flexible display, and a three-dimensional (3D) display. Some of the displays may be configured in a transparent type or light-transmissive type allowing the outside to be viewed therethrough. This may be configured in the form of a transparent display including a transparent OLED (TOLED) display.

According to an embodiment of the disclosure, the electronic device 201 may include, in addition to the display 230, another display (e.g., an expanded display or flexible display) or a display of an external electronic device (e.g., at least one of an external display device, a wearable device, or an external terminal device) interworking with the first electronic device 201.

According to an embodiment of the disclosure, the communication interface 240 (e.g., the communication interface 170 of FIG. 1) of the first electronic device 201 may perform communication with an external electronic device (e.g., the electronic device 102 or 104 of FIG. 1) under the control of the processor 210. According to an embodiment of the disclosure, the communication interface 240 may transmit or receive data related to an operation run under the control of the processor 210 to/from an external device. The communication interface 240 may connect to a network via wired communication or wireless communication or may perform communication via inter-device connection. The wireless connection may be made by various radio communication protocols, including, but not limited to, wireless fidelity (Wi-Fi), Bluetooth (BT), ZigBee, Z-wave, near-field communication (NFC), global positioning system (GPS), or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM)). The wired communication may include at least one of, e.g., universal serial bus (USB), high definition multimedia interface (HDMI), recommended standard 232 (RS-232), plain old telephone service (POTS), universal asynchronous receiver transmitter (UART), inter-integrated circuit (I2C), serial peripheral interface (SPI), or controller area network (CAN). The communication interface 240 may include all other types of communication schemes that have been widely known or are to be developed in the future, in addition to the above-enumerated communication schemes.

According to an embodiment, the communication interface 240 may connect to at least one nearby external electronic device 203 and 205 (e.g., the electronic device 102 or 104 of FIG. 1) capable of short-range wireless communication to perform short-range wireless communication. The communication interface 240 may receive wireless signals (e.g., beacon signals or discovery signals) from at least one access point 203 located in the space-of-interest or adjacent areas via periodic wireless signal scanning.

According to an embodiment of the disclosure, the first electronic device 201 may further include an audio module (not shown) (e.g., the input device 150 of FIG. 1). The audio module may output sounds and may include at least one of, e.g., an audio codec, a microphone (MIC), a receiver, an earphone output (EAR_L) or a speaker.

According to an embodiment of the disclosure, the first electronic device 201 may further include a means for outputting vibrations or a means for outputting smells.

Each of the aforementioned components of the electronic device may include one or more parts, and a name of the part may vary with a type of the first electronic device 201. The first electronic device 201 in accordance with various embodiments of the disclosure may include at least one of the aforementioned components, omit some of them, or include other additional component(s). Some of the components of the first electronic device 201 may be combined into an entity, but the entity may perform the same functions as the components may do.

Operational procedures for short-range wireless communication by the first electronic device as described above is described below in detail with reference to the accompanying drawings.

Figure 3:
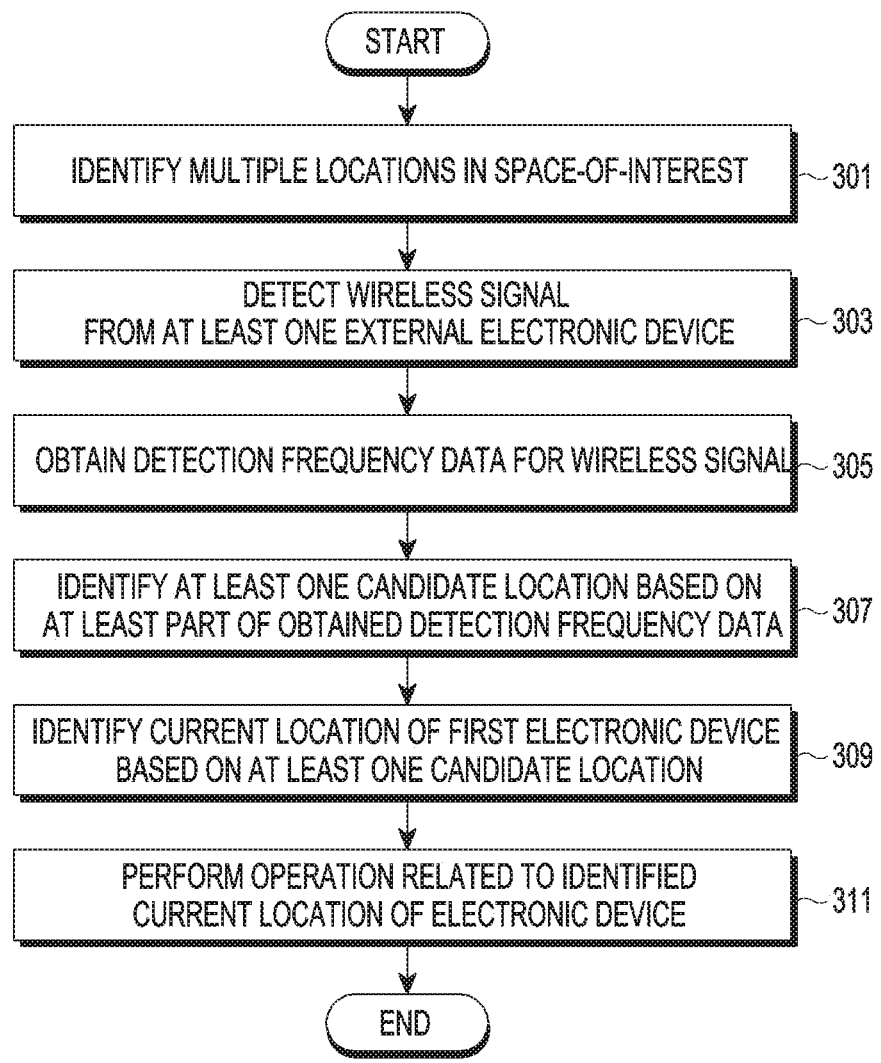
FIG. 3 is a view illustrating an example operation procedure of a first electronic device according to an embodiment of the disclosure.

FIG. 3 is a view illustrating an example operation procedure of a first electronic device according to an embodiment of the disclosure.

Referring to FIG. 3, according to an embodiment, in operation 301, a first electronic device (e.g., the electronic device 101 of FIG. 1 or the first electronic device 201 of FIG. 2) may obtain a plurality of locations in a space-of-interest. Here, the space-of-interest may be an indoor space set by the user or where the user is located. According to an embodiment, when a request or event for identifying the current location of the first electronic device, the first electronic device may identify locations preset by the user (e.g., a living room, kitchen, bedroom, and bathroom as locations into which the space-of-interest has been divided) as the plurality of locations. According to an embodiment, the first electronic device may border the areas of the space-of-interest according to the detection frequency or signal strength of at least one wireless signal detected in the space-of-interest and identify the preset locations as the plurality of locations.

In operation 303, the first electronic device may detect a wireless signal from at least one second electronic device (e.g., the electronic devices 102 and 104 of FIG. 1 or the external electronic devices 203 and 205 of FIG. 2) located in the space-of-interest or adjacent area. The first electronic device may detect wireless signals received from at least one second electronic device via repeated wireless signal scanning during a preset time.

In operation 305, the first electronic device may calculate the detection frequency for the wireless signal received from the at least one second electronic device and obtain the detection frequency data for the calculated detection frequency.

In operation 307, the first electronic device may identify at least one candidate location among the plurality of locations based on at least part of the obtained detection frequency data. The first electronic device may identify at least one location corresponding to reference data of the same or similar ratio to the detection frequency data from a database stored in the memory and identify the at least one identified location as the candidate location.

In operation 309, the first electronic device may identify the current location of the electronic device based on the at least one identified candidate location.

In operation 311, the first electronic device may perform an operation related to the identified current location. According to an embodiment, the first electronic device may perform an operation suited for the identified location (e.g., the identified current location or final location). For example, for a robot vacuum, the first electronic device may perform control to start cleanup in the identified location, for a portable air purifier, perform control to purify air in the identified location, and for a security camera, perform control to record video in the identified location.

Figure 4:
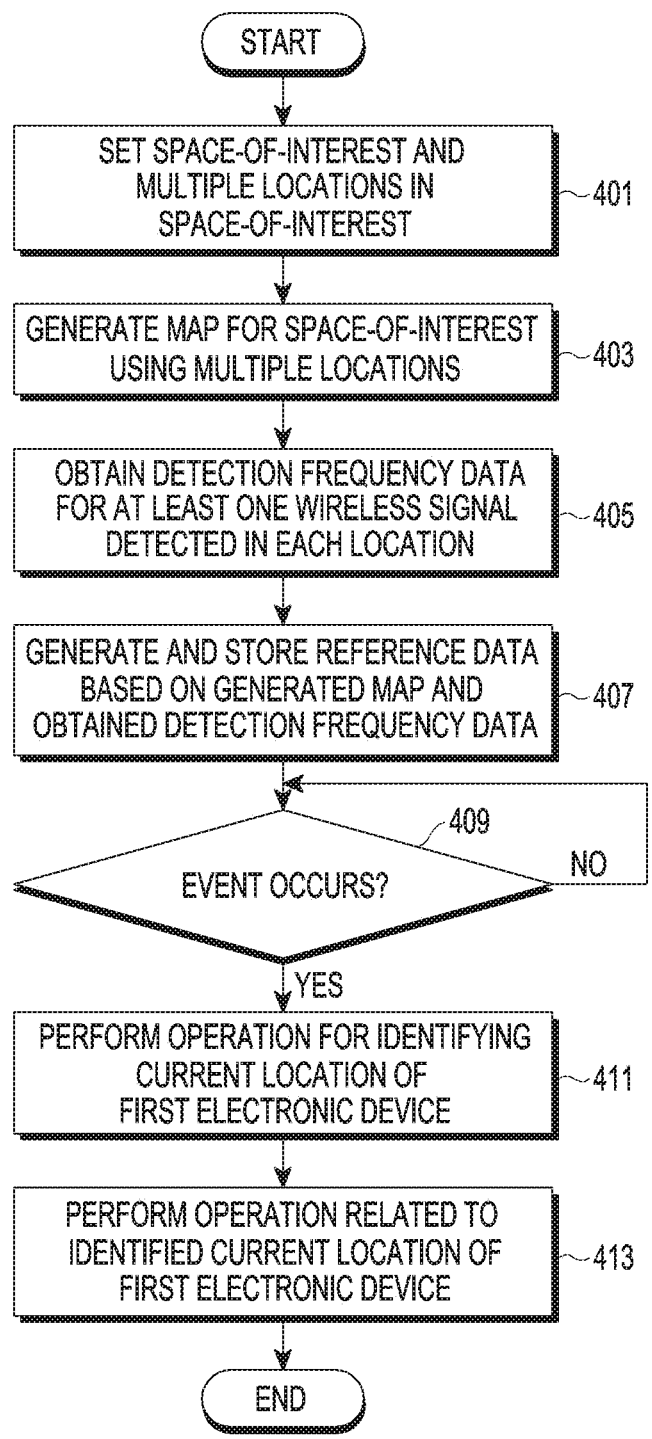
FIG. 4 is a view illustrating an example operation procedure of a first electronic device according to an embodiment of the disclosure.
Figure 5:
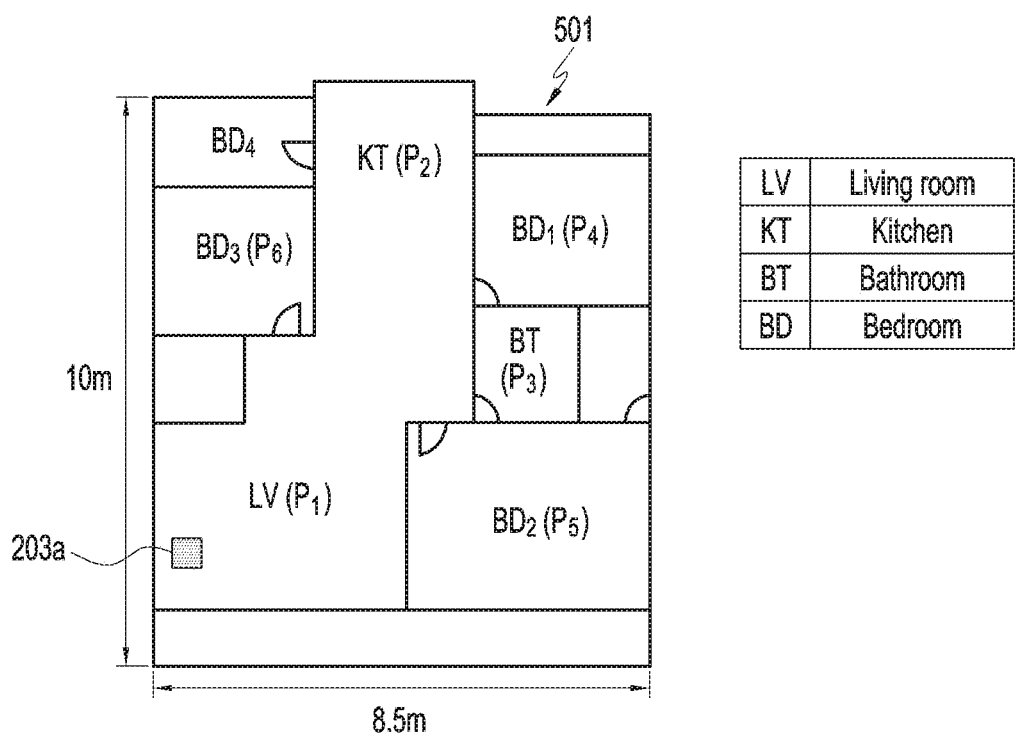
FIG. 5 is a view illustrating an example in which a first electronic device obtains a plurality of locations in a space-of-interest according to an embodiment of the disclosure.

FIG. 4 is a view illustrating an example operation procedure of a first electronic device according to an embodiment of the disclosure. FIG. 5 is a view illustrating an example in which a first electronic device obtains a plurality of locations in a space-of-interest according to an embodiment of the disclosure. FIG. 6 is a view illustrating example reference data according to an embodiment of the disclosure.

Referring to FIG. 4, according to an embodiment, in operation 401, a first electronic device (e.g., the electronic device 101 of FIG. 1 or the first electronic device 201 of FIG. 2) may set a space preset by the user or its current location as the space-of-interest. The first electronic device may divide the set point-of-interest (POI) into a plurality of locations. According to an embodiment, if a space-of-interest is set to permit location identification on the settings menu of the application, the first electronic device may set a plurality of distinct locations as the set space-of-interest is divided into the plurality of locations by the user depending on space properties. According to an embodiment, the first electronic device may differentiate the plurality of locations based on at least one wireless signal detected in the space-of-interest. According to an embodiment, the first electronic device may set a space for permitting location identification on the settings menu of the locating application as the space-of-interest. According to an embodiment, rather than manually setting the space-of-interest by the user, the first electronic device may automatically set the indoor space where the first electronic device is located as the space-of-interest.

Referring to FIG. 5, according to an embodiment, the first electronic device may set the indoor space (e.g., home) where it is located as the space-of-interest 501 and may divide the set space-of-interest 501 into identifiable areas (e.g., a living room LV, a kitchen KT, a bathroom BT, and a bedroom BD) depending on the properties of the set space-of-interest 501. The first electronic device may set a plurality of locations P1(LV), P2(KT), P3(BT), P4(BD1), P5(BD2), and P6(BD3) based on the areas in the space-of-interest 501.

In operation 403, the first electronic device may arrange the plurality of set locations in a virtual space corresponding to the space-of-interest, thereby generating a map for the space-of-interest. According to an embodiment, the generated map may not fully match, in structure, size, or properties, the actual indoor space where the first electronic device is located. The map may be a virtual space formed in two-dimensions (2D) or three-dimensions (3D) based on various pieces of information related to the space-of-interest. As shown in FIG. 5, the first electronic device may form a 2D virtual space in which the plurality of locations P1(LV), P2(KT), P3(BT), P4(BD1), P5(BD2), and P6(BD3) set in the space-of-interest 501 and generate the formed virtual space as the map for the space-of-interest 501. The first electronic device may visually represent the external electronic device 203a, which is located in the space-of-interest 501, on the generated map and display the generated map on the screen of the display.

In operation 405, the first electronic device may obtain detection frequency data for at least one wireless signal detected in each location. According to an embodiment, in a case where the plurality of locations is differentiated by the user, the detection frequency data may be obtained according to the detection frequency for at least one wireless signal detected during a predetermined time in each location via the user's experiment. According to an embodiment, the first electronic device may automatically obtain the detection frequency data for at least one wireless signal received during a preset time via wireless signal scanning in the space-of-interest.

In operation 407, the first electronic device may generate and store reference data based on the detection frequency data for the at least one wireless signal. According to an embodiment, the first electronic device may generate reference data corresponding to each of the plurality of locations using the detection frequency data and the generated map, map each generated reference data piece to each location, and store them in the database of the memory. The database for storing the reference data for each location is as shown in FIG. 6, and the reference data may be differentiated for each of the plurality of locations P1(LV), P2(KT), P3(BT), P4(BD1), P5(BD2), and P6(BD3) set in the space-of-interest 501, which may include detection frequency data for each wireless signal detected from each external electronic device AP1, AP2, AP3, and AP4. For example, the reference data corresponding to a first location P1 may include, e.g., a detection frequency data set (30, 1, 10, 1), the reference data corresponding to a second location P2 may include, e.g., a detection frequency data set (30, 5, 5, 0), the reference data corresponding to a third location P3 may include, e.g., a detection frequency data set (15, 3, 0, 0), the reference data corresponding to a fourth location P4 may include, e.g., a detection frequency data set (10, 17, 0, 1), the reference data corresponding to a fifth location P5 may include, e.g., a detection frequency data set (20, 10, 0, 1), and the reference data corresponding to a sixth location P6 may include, e.g., a detection frequency data set (15, 1, 15, 0).

In operation 409, the first electronic device may identify whether an event (or request) occurs to identify the current location of the first electronic device. When the event is identified to occur, the first electronic device performs operation 411 and, unless the event occurs, the first electronic device may again perform operation 409.

In operation 411, the first electronic device may perform an operation for identifying its current location as in the operation procedure of FIG. 3.

In operation 413, the first electronic device may perform an operation related to the identified current location. According to an embodiment, the first electronic device may perform an operation suited for the identified location (e.g., the identified current location or final location). For example, for a robot vacuum, the first electronic device may perform control to start cleanup in the identified location, for a portable air purifier, perform control to purify air in the identified location, and for a security camera, perform control to record video in the identified location.

Figure 7:
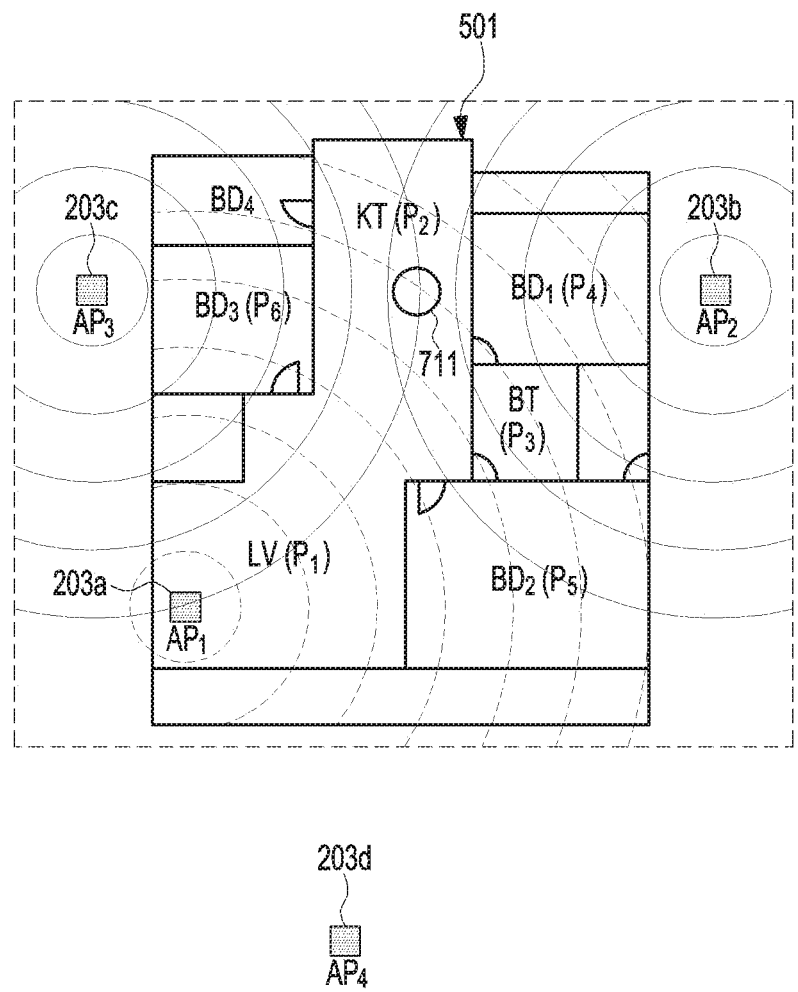
FIG. 7 is a view illustrating an example in which a first electronic device identifies a final location according to an embodiment of the disclosure.

FIG. 7 is a view illustrating an example in which a first electronic device identifies a final location according to an embodiment of the disclosure.

Referring to FIGS. 3, 4, and 7, according to an embodiment, the first electronic device may identify a plurality of locations P1(LV), P2(KT), P3(BT), P4(BD1), P5(BD2), and P6(BD3) preset in the space-of-interest 501.

The first electronic device may detect wireless signals received from at least one external electronic device (at least one of AP1, AP2, AP3, or AP4) via wireless signal scanning during a preset time periodically or as per a request for identifying the current location of the electronic device and calculate the detection frequency for the at least one detected wireless signal. For example, the first electronic device may generate a list of external electronic devices from which at least one or more wireless signals have been detected in the space-of-interest 501. The first electronic device may include count information about the detection frequency for the wireless signal detected in each wireless signal scanning operation in the generated external electronic device list. The first electronic device may identify the detection frequency for the wireless signal obtained during the preset time based on the count information contained in the list.

The first electronic device may compare the detection frequency data according to the detection frequency for at least one wireless signal detected in the space-of-interest 501 with per-location reference data contained in the database as shown in FIG. 6. The first electronic device may identify at least one pre-stored reference data piece which has a similar ratio to the detection frequency data and identify the location (e.g., at least one of P1, P2, and P6) corresponding to the at least one identified reference data piece. The first electronic device may determine that the at least one identified location (e.g., at least one of P1, P2, and P6) is the candidate location. According to an embodiment, when no reference data similar to the detection frequency data for the currently detected signal is discovered, the first electronic device may determine that the neighboring location within a predetermined distance of the prior location (e.g., a bedroom or bathroom) of the first electronic device is the candidate location.

Referring to FIG. 6, according to an embodiment, the first electronic device may identify that wireless signals of a preset signal strength or more have been detected during a preset time (e.g., 10 seconds) from, e.g., the first access point AP1 203a, the second access point AP2 203b, and the third access point AP3 203c among the external electronic devices (e.g., the first access point AP1 203a, the second access point AP2 203b, the third access point AP3 203c, and the fourth access point AP4 203d) located in the space-of-interest 501 or adjacent area. Thus, the first electronic device may obtain the detection frequency data (5, 1, 1) for the wireless signals detected from the identified external electronic devices 203a, 203b, and 203c during the preset time (e.g., 10 seconds).

The first electronic device may search the database for the location corresponding to the reference data having similar ratios to the detection frequency data (5, 1, 1). As a result of search, the reference data (30, 1, 10, 1) for the first location P1, the reference data (30, 5, 5, 0) for the second location P2, and the reference data (15, 1, 15, 0) for the sixth location P6 may be discovered as the reference data having similar ratios, and the discovered locations P1, P2, and P6 may be determined to be the candidate locations. The first electronic device may determine that among the discovered locations P1, P2, and P6, the second location P2 has the most similar ratio and determine the current location 711 of the first electronic device based on the second location P2.

According to an embodiment, when a single candidate location is determined, the first electronic device may determine that the candidate location is the final location.

According to an embodiment, the first electronic device may identify that the first electronic device is located in the kitchen KT which is indicated by the second location P2. According to an embodiment, the first electronic device may determine that the one with the largest signal strength among the candidate locations corresponding to similar ratios is the final location of the current location of the first electronic device.

According to an embodiment, when there is a plurality of candidate locations, the first electronic device may determine that one of at least one candidate location is the final location based on the wireless communication fingerprint via wireless communication fingerprinting. As used herein, 'wireless communication fingerprint' may refer to unique wireless signal values representing a particular space and capable of using Wi-Fi. Basically, the wireless communication fingerprint may be calculated based on the strength of signal produced from the access point, be inverse-proportional to the square of the distance away from the access point, and be determined as vectors for different signal strengths from a plurality of access points AP1, AP2, . . . , APn. For example, a similarity may be determined between each of at least one access point and the first electronic device via wireless communication fingerprinting, and the candidate location with the highest wireless communication fingerprint similarity may be determined to be the final location. In other words, a user locating unit (not shown) may be previously trained with the wireless communication fingerprint in each location via a learning process, and the final location closest to the current wireless communication fingerprint may be determined based on what has been learned. According to an embodiment, the first electronic device may calculate the similarity between each of at least one candidate location and the wireless communication fingerprint of the first electronic device and, if one of the at least one candidate location meets the similarity reference, determine that the candidate location is the final location. Here, the similarity reference may be determined by the distance between the wireless communication fingerprint of the first electronic device and the candidate location. Alternatively, if at least two candidate locations physically adjacent to each other among the at least one candidate location meet the similarity reference, the first electronic device may determine that the midway area formed by the at least two adjacent candidate locations is the final location.

Referring back to FIG. 7, according to an embodiment, the first electronic device may identify that wireless signals are detected from, e.g., three external electronic devices AP1, AP2, and AP3 via wireless signal scanning during a preset time periodically or at a request for identifying the current location of the electronic device (or when an event occurs). As the wireless signals are detected from each of the three external electronic devices AP1, AP2, and AP3, the first electronic device may determine candidate locations in the identified locations based on the respective signal strengths of the detected wireless signals.

For example, in a case where the first access point 203a is located in the space-of-interest 501, and the second access point 203b and the third access point 203c are located outside the space-of-interest 501, a signal distribution in the space-of-interest 501 may be as shown in FIG. 7. The wireless signal received from the first access point 203a may attenuate in signal strength as going away from the area where the first access point 203a is located. Likewise, the wireless signal received from the second access point 203b may attenuate in signal strength as going away from the area (e.g., BD3 (P6)) adjacent to the second access point 203b, and the wireless signal received from the third access point 203c may attenuate in signal strength as going away from the area (e.g., BD1(P4)) adjacent to the third access point 203c. Thus, the first electronic device may perform 3D density-based space clustering, thereby identifying the distribution of measurement data obtained by signal strength measurement of wireless signals in the space-of-interest 501 and identifying the locations of the areas where measurement data is densely distributed as candidate locations.

The first electronic device may obtain detection frequency data for the wireless signal detected during a preset time from each of the first access point AP1 203a, the second access point AP2 203b, and the third access point AP3 203c among the identified candidate locations and determine the final location which indicates the current location of the first electronic device among the candidate locations based on the detection frequency data for each wireless signal. For example, in a case where the detection frequency data set of a first candidate location 118 is (AP1, AP2, AP3)=(3, 1, 2), the detection frequency data set of a second candidate location is (AP1, AP2, AP3)=(6, 2, 4), and the detection frequency data set of the third candidate location is (AP1, AP2, AP3)=(2, 7, 13), since the first and second candidate locations have similar detection frequency ratios, the first electronic device may determine that the first and second candidate locations are in the same area (e.g., the kitchen) and the third candidate location is in a different area (e.g., the living room). Thus, the first electronic device may determine that the higher detection-frequency one of the first candidate location and the second candidate location, i.e. the second candidate location whose signal strength is higher, is the final location.

According to an embodiment, a method for identifying a location by an electronic device comprises obtaining a plurality of locations in a space-of-interest, detecting a wireless signal from at least one external electronic device located in the space-of-interest or an adjacent area, obtaining detection frequency data according to a frequency of detection of the wireless signal, and identifying a current location of the electronic device based on at least part of the obtained detection frequency data.

According to an embodiment, the method may further comprise identifying at least one candidate location among the plurality of locations based on at least part of the detection frequency data. The current location may be identified based on the at least one candidate location.

According to an embodiment, identifying the at least one candidate location may include identifying at least one location corresponding to reference data of the same or similar ratio to the detection frequency data from a database stored in a memory and identifying the at least one identified location as the candidate location.

According to an embodiment, identifying the at least one candidate location may include identifying that at least one location adjacent to a prior-identified location of the electronic device is the at least one candidate location unless the at least one location corresponding to the reference data of the same or similar ratio to the detection frequency data is identified.

According to an embodiment, identifying the current location may include, when there are a plurality of candidate locations as identified, identifying a similarity between each of the plurality of candidate locations and a wireless communication fingerprint of the electronic device, the wireless communication fingerprint set based on a strength of a wireless signal detected from the at least one external electronic device and determining that a candidate location with a highest similarity as identified is the current location.

According to an embodiment, the method may further comprise identifying a plurality of candidate locations among the plurality of locations based on a signal strength of the detected wireless signal. The current location may be identified to be one of the plurality of identified candidate locations based on the detection frequency data.

According to an embodiment, the method may further comprise generating reference data used for identifying the candidate location in each of the plurality of locations before obtaining the plurality of locations in the space-of-interest according to a request for identifying the current location of the electronic device and controlling a memory to store the generated reference data in a database of the memory.

According to an embodiment, generating the reference data may include setting the space-of-interest and the plurality of locations to be identified in the set space-of-interest, generating a map for the space-of-interest using the plurality of set locations, detecting a wireless signal from the at least one external electronic device in each of the plurality of locations during a preset time, obtaining detection frequency data for the detected wireless signal, and generating the reference data using the generated map and the obtained detection frequency data.

According to an embodiment, setting the plurality of locations may include splitting the space-of-interest into preset unit areas, obtaining detection frequency data for the wireless signal detected from the at least one external electronic device in each unit area, and differentiating the plurality of locations based on the obtained detection frequency data.

According to an embodiment, setting the plurality of locations may include setting space areas divided by a user according to a property of the space-of-interest as the plurality of locations.

According to an embodiment, the method may further comprise displaying the map for the space-of-interest visually representing the at least one candidate location and the plurality of locations identified in the space-of-interest and, upon identifying the current location of the electronic device, controlling a display to display the identified current location on the generated map.

According to an embodiment, the method may further comprise, when the current location is identified, updating pre-stored reference data based on the obtained detection frequency data.

Next, a configuration of a server for identifying the location of the first electronic device and an operation procedure of the server are described below with reference to the accompanying drawings.

Figure 8:
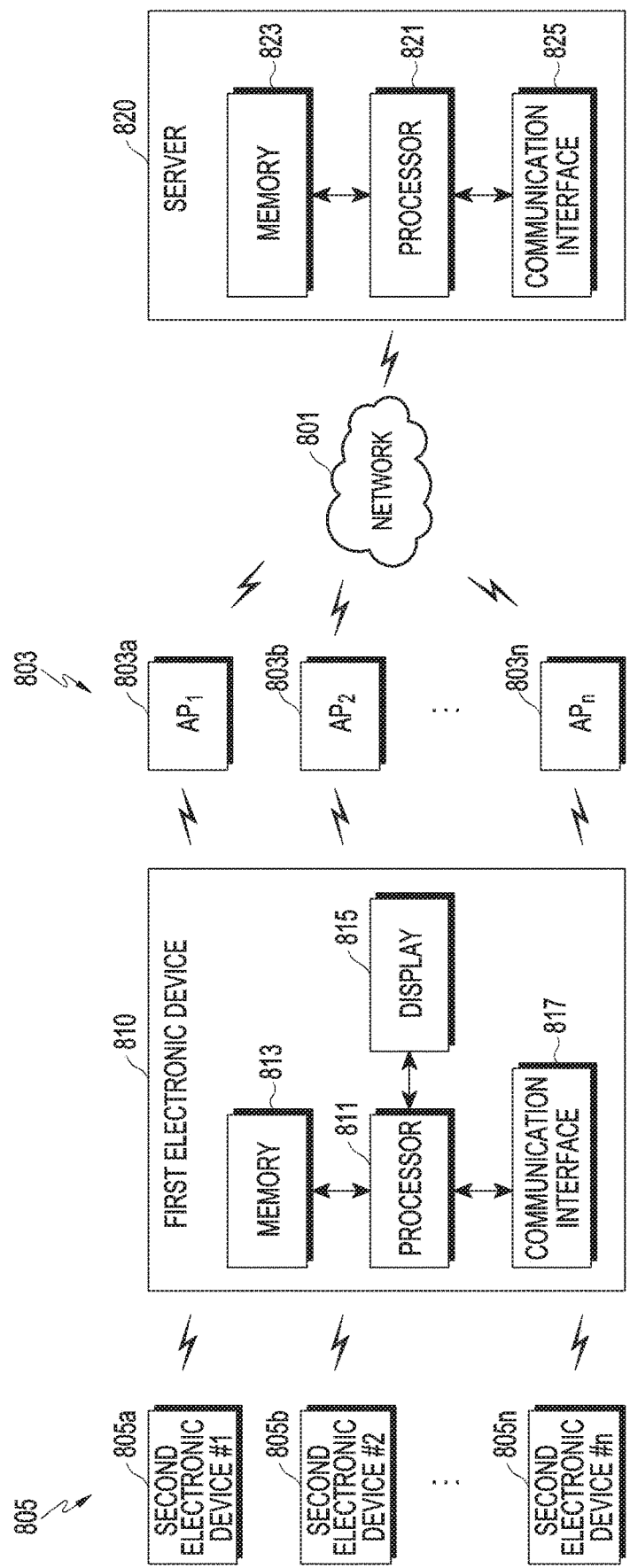
FIG. 8 is a view illustrating example configurations of a first electronic device and a server in a network environment according to an embodiment of the disclosure.

FIG. 8 is a view illustrating example configurations of a first electronic device and a server in a network environment according to an embodiment of the disclosure.

Referring to FIG. 8, according to an embodiment, in a network environment, a first electronic device 810 (e.g., the electronic device 101 of FIG. 1 or the first electronic device 201 of FIG. 2) may communicate with a server 820 via a network 801 and may perform short-range wireless communication with external electronic devices, e.g., at least one access point 803, 803a, 803b, . . . , 803n and second electronic devices (e.g., IoT devices, wearable devices, or other communicable electronic devices) 805, 805a, 805b, . . . , 805n.

Referring back to FIG. 8, according to an embodiment, the first electronic device 810 may include at least one of a processor 811, a memory 813, a display 815, and a communication interface 817. The memory 813, display 815, and communication interface 817 of the first electronic device 810 may be the same in configuration as the memory 220, display 230, and communication interface 240 of the first electronic device 201 of FIG. 2, and no detailed description thereof is thus given below.

According to an embodiment, the processor 811 may detect a wireless signal from at least one external electronic device located in the space-of-interest or an adjacent area during a preset time. The detection frequency data may refer to the frequency or probability of detection of at least one external electronic device via wireless signal scanning or detection during the preset time. The wireless signal may be a beacon signal or discovery signal transmitted from at least one access point 803 located in the space-of-interest or adjacent area via wireless signal scanning which is periodically performed or an IoT signal or NFC signal detected from the second electronic device 805 located in the space-of-interest.

According to an embodiment, the processor 811 may obtain detection frequency data for the detected wireless signal and transmit the obtained detection frequency data to the server 820.

According to an embodiment, the processor 811 (e.g., the processor 120 of FIG. 1) may process information according to an operation of the electronic device or information according to execution of a program, an application, or a function, and the processor 210 may perform control to display the processed information on the display unit 815 or output the processed information through an audio module (not shown) or vibration module (not shown).

Referring back to FIG. 8, according to an embodiment, the server 820 for identifying locations may include a processor 821, a memory 823, and a communication interface 825.

According to an embodiment, the processor 821 may be configured to, before obtaining a plurality of locations in the space-of-interest as per a request for identifying the current location of the first electronic device 810, generate reference data used for identifying the candidate location in each of the plurality of locations and control the memory 823 to previously store the generated reference data in a database of the memory 823. Upon generating the reference data, the processor 821 may set the space-of-interest and the plurality of locations to be identified in the space-of-interest and generate a map for the space-of-interest using the plurality of set locations. Upon generating the reference data, the processor 821 may receive, from the first electronic device 810, detection frequency data for a wireless signal detected from at least one external electronic device 803 and 805 and generate the reference data using the received detection frequency data and the generated map. The reference data for each location may include identification information about the at least one external electronic device, the detection frequency data, and location identification information.

According to an embodiment, the processor 821 may arrange areas (e.g., a living room, kitchen, bedroom, bathroom, and multi-purpose room) into which the space-of-interest is divided by the user according to the properties of the space-of-interest in a virtual space (e.g., an indoor floor plan) corresponding to the space-of-interest, thereby generating a map (e.g., a detection frequency map) for the space-of-interest. The processor 821 may map the reference data corresponding to each of the areas arranged on the generated map to the generated map and control the memory 823 to previously store the resultant map in the database of the memory 823.

According to an embodiment, the processor 821 may set a plurality of locations more accurately bordered, for the areas into which the space-of-interest has been divided by the user, based on the received detection frequency data. For example, the processor 821 may accurately divide the areas of the space-of-interest into a kitchen (e.g., identification code 001), a living room (e.g., identification code 002), a bedroom (e.g., identification code 003), a midway area (e.g., identification code 004) between the kitchen and the living room, a midway area (e.g., identification code 005) between the living room and the bedroom, a midway area (e.g., identification code 006) between the kitchen and the bedroom, and a midway area (e.g., identification code 006) between the kitchen, living room, and bedroom, according to deviations in detection frequency of the wireless signals received from the plurality of access points 803.

According to an embodiment, the processor 821 may split the space-of-interest into preset unit areas, receive, from the first electronic device 810, detection frequency data for the wireless signal detected from the at least one external electronic device in each of the unit areas, and differentiate the plurality of locations based on the received detection frequency data.

According to an embodiment, the plurality of identifiable locations may be previously divided into by the user in which case the processor 821 may differentiate the plurality of locations by identifying the overlap of the plurality of locations, grouping similar locations, or performing density-based clustering in the generated map based on the detection frequency data for the wireless signal. The overlap identification may be performed to identify whether two or more locations divided into by the user are identical to each other.

According to an embodiment, the processor 821 may be configured to identify a plurality of locations preset in the space-of-interest at a request for identifying the location of the first electronic device 810 or when an event occurs.

According to an embodiment, the processor 821 may be configured to identify at least one candidate location among the plurality of particular locations based on at least part of the obtained detection frequency data and identify the current location of the electronic device based on the at least one identified candidate location. The processor 821 may be configured to identify the current location of the electronic device based on the at least one identified candidate location.

According to an embodiment, the processor 821 may select at least one location corresponding to a similar ratio to the detection frequency ratio between detection frequency data pieces for the wireless signals detected from the at least one external electronic device 803 and 805 in the detection frequency map and identify the at least one selected location as the candidate location. According to an embodiment, unless no identifiable location having the similar ratio is selected, the processor 821 may determine that an identifiable location adjacent to the prior identifiable location of the first electronic device 810 is the at least one candidate location.

According to an embodiment, if a single candidate location is determined, the processor 821 may determine that the determined candidate location is the final location. According to an embodiment, if a plurality of candidate locations is determined, the processor 821 may obtain similarities between the wireless communication fingerprint of the first electronic device 201 identified via wireless communication fingerprinting and each determined candidate location and identify the candidate location with the highest similarity among the candidate locations as the final location. According to an embodiment, if there are identified at least two candidate locations physically adjacent to each other based on the obtained similarities, the processor 821 may identify that the midway location between the areas formed by the two identified candidate locations is the final location. The operation of identifying the final location using wireless communication fingerprinting is the same as the operation described above in connection with FIG. 7.

According to an embodiment, if the final location is determined, the processor 821 may be configured to update pre-stored reference data based on the detection frequency data for the wireless signal from the at least one particular access point.

According to an embodiment, if the current location of the first electronic device 810 is identified, the processor 821 may put the identified current location on the generated map and perform control to perform an operation related to the current location of the first electronic device 810 using the generated map. According to an embodiment, the processor 821 may transmit relevant information and the map to the first electronic device 810 or another device so that the first electronic device 810 or the other device may perform the operation related to the current location of the first electronic device 810.

According to an embodiment of the disclosure, the processor 821, which may be a hardware module or software module (e.g., an application program), may be a hardware component (function) or software component (program) including at least one of various sensors, data measuring module, input/output interface, a module for managing the state or environment of the electronic device, or communication module as included in the electronic device.

According to an embodiment of the disclosure, the processor 821 may include one of, e.g., hardware, software, or firmware, or a combination of two or more thereof. According to an embodiment of the disclosure, the processor 210 may lack at least some of the components or may include other components for performing an image processing operation in addition to the components.

According to an embodiment of the disclosure, the memory 820 of the server 820 may temporarily store various data generated while the program runs, as well as a program necessary for a functional operation according to an embodiment. The memory 823 may largely include a program area and a data area. The program area may store relevant information for driving the electronic device, such as operating system (OS) for booting up the electronic device. The data area may store data communicated and generated according to an embodiment of the disclosure. Further, the memory 823 may include at least one storage medium of a flash memory, a hard disk, a multimedia card, a micro-type memory (e.g., a secure digital (SD) or an extreme digital (xD) memory), a random access memory (RAM), or a read only memory (ROM).

According to an embodiment, the memory 823 may store information for short-range wireless communication with at least one external electronic device 803 and 805 and data transmitted and received.

According to an embodiment, the memory 823 may store information about a preset space-of-interest and a plurality of locations in the space-of-interest, and the memory 220 may store information related to a map for the space-of-interest, which is generated based on the plurality of set locations. The memory 823 may store the detection frequency data received from the first electronic device 810. The memory 823 may include a database pre-storing reference data generated based on the detection frequency data.

According to an embodiment, if the current location of the first electronic device 810 is identified, the memory 823 may be configured to update the pre-stored reference data based on the detection frequency data for the detected wireless signal upon performing the operation for identifying the location of the first electronic device 810. If the current location of the first electronic device 810 is identified, the memory 823 may store the identified current location.

According to an embodiment, the communication interface 825 of the first electronic device may perform communication with the first electronic device 810 under the control of the processor 821. According to an embodiment of the disclosure, the communication interface 825 may transmit or receive data related to an operation executed under the control of the processor 821 to/from the first electronic device 810. The communication interface 825 may connect to a network via wired communication or wireless communication or may perform communication via inter-device connection. The wireless connection may be made by various radio communication protocols, including, but not limited to, wireless fidelity (Wi-Fi), Bluetooth (BT), ZigBee, Z-wave, near-field communication (NFC), global positioning system (GPS), or cellular communication protocols (e.g., long term evolution (LTE), LTE-advanced (LTE-A), code division multiple access (CDMA), wideband CDMA (WCDMA), universal mobile telecommunications service (UMTS), wireless broadband (WiBro) or global system for mobile communications (GSM). The wired communication may include at least one of, e.g., USB, HDMI, RS-232, POTS, UART, I2C, SPI, or CAN. The communication interface 825 may include all other types of communication schemes that have been widely known or are to be developed in the future, in addition to the above-enumerated communication schemes.

According to an embodiment of the disclosure, however, the components of the server 820 shown in FIG. 8 are not essential components, and the server 810 may be implemented with more or less components than those shown. The positions of the major components of the server 810 described above in connection with FIG. 8 may be varied according to various embodiments.

According to an embodiment, an electronic device (e.g., the server 820 of FIG. 8) for identifying a location may comprise a communication interface configured to communicate with a first electronic device, a processor connected with the communication interface and a memory, and the memory storing instructions executed by the processor, wherein the processor may be configured to obtain a plurality of locations in a space-of-interest, receive, from the first electronic device, detection frequency data for a wireless signal received from at least one external electronic device adjacent to the first electronic device, identify a current location of the first electronic device based on at least part of the received detection frequency data, and perform an operation related to the identified current location.

Figure 9:
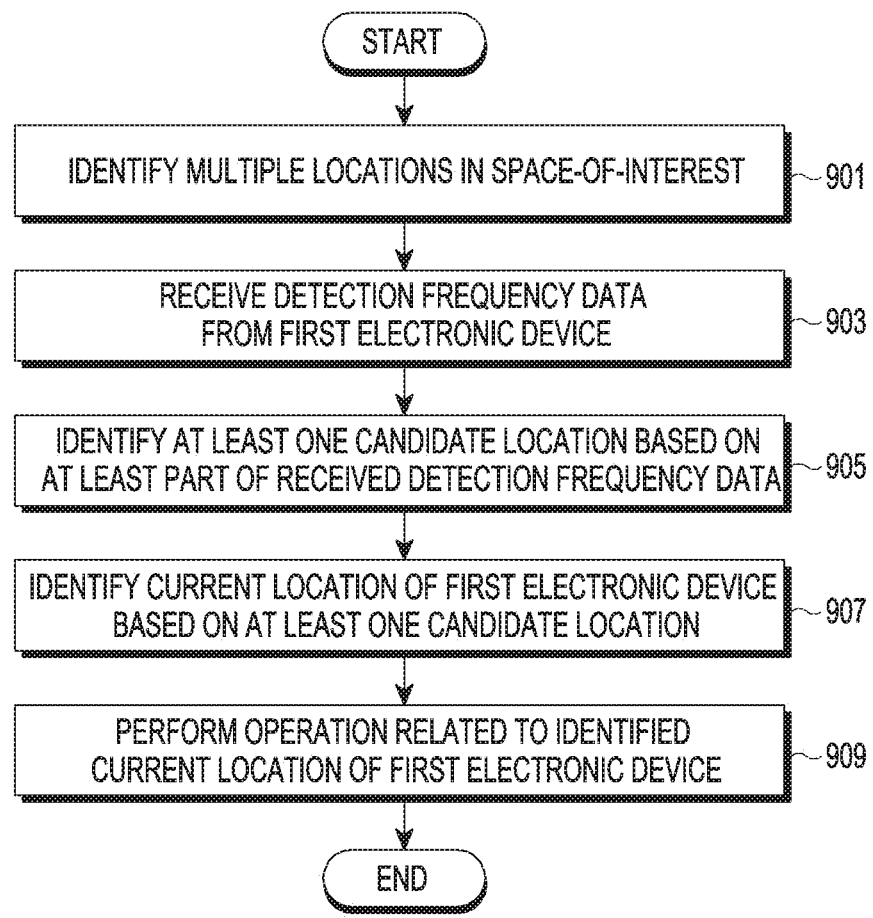
FIG. 9 is a view illustrating an example operation procedure of a server according to an embodiment of the disclosure.

FIG. 9 is a view illustrating an example operation procedure of a server according to an embodiment of the disclosure.

Referring to FIG. 9, a server (e.g., the server 820 of FIG. 8) may obtain a plurality of locations in a space-of-interest in operation 901. Here, the space-of-interest may be an indoor space set by the user or where the user is located. According to an embodiment, when a request or event for identifying the current location of a first electronic device (e.g., the first electronic device 810 of FIG. 8), the server may identify locations preset by the user (e.g., a living room, kitchen, bedroom, and bathroom as locations into which the space-of-interest has been divided) as the plurality of locations. According to an embodiment, the server may border the areas of the space-of-interest according to the detection frequency or signal strength of at least one wireless signal detected by the first electronic device in the space-of-interest and identify the preset locations as the plurality of locations.

In operation 903, as a wireless signal is detected from at least one second electronic device (e.g., the electronic devices 102 and 104 of FIG. 1 or the external electronic devices 803 and 805 of FIG. 2) located in the space-of-interest or adjacent area, the server may receive detection frequency data for the detected wireless signal from the first electronic device.

In operation 905, the server may identify at least one candidate location among the plurality of locations based on at least part of the received detection frequency data. The server may identify at least one location corresponding to reference data of the same or similar ratio to the detection frequency data from a database stored in the memory (e.g., the memory 823 of FIG. 8) and identify the at least one identified location as the candidate location.

In operation 907, the server may identify the current location of the first electronic device based on the at least one identified candidate location. Here, the identified current location may be identified as the final location. According to an embodiment, after operation 907, an additional operation for identifying the final location may be performed to more accurately identify the current location based on the identified current location.

In operation 909, the server may perform an operation related to the identified current location. According to an embodiment, the server may perform an operation suited for the identified location (e.g., the identified current location or final location). For example, for a robot vacuum, the server may perform control to start cleanup in the identified location, for a portable air purifier, perform control to purify air in the identified location, and for a security camera, perform control to record video in the identified location.

The operation procedure described above in connection with FIG. 9 may regard the embodiment of identifying candidate locations based on the detection frequency data and identifying the final location among the identified candidate locations. In operation 909, the final location may be identified by wireless communication fingerprinting so as to more accurately identify the final location as described above in connection with FIG. 7.

The server may receive information about the wireless communication fingerprint obtained based on the wireless signal detected from the first electronic device and identify candidate locations based on the received wireless communication fingerprint information as described above in connection with FIG. 7. The server may identify the final location of the first electronic device among the identified candidate locations based on the detection frequency data received from the first electronic device. Specific operations for identifying the candidate locations and identifying the final location are identical to the operations of the first electronic device described above in connection with FIG. 7.

Each of the aforementioned components of the electronic device may include one or more parts, and a name of the part may vary with a type of the server. The server in accordance with various embodiments of the disclosure may include at least one of the aforementioned components, omit some of them, or include other additional component(s). Some of the components may be combined into an entity, but the entity may perform the same functions as the components may do.

Figure 10:
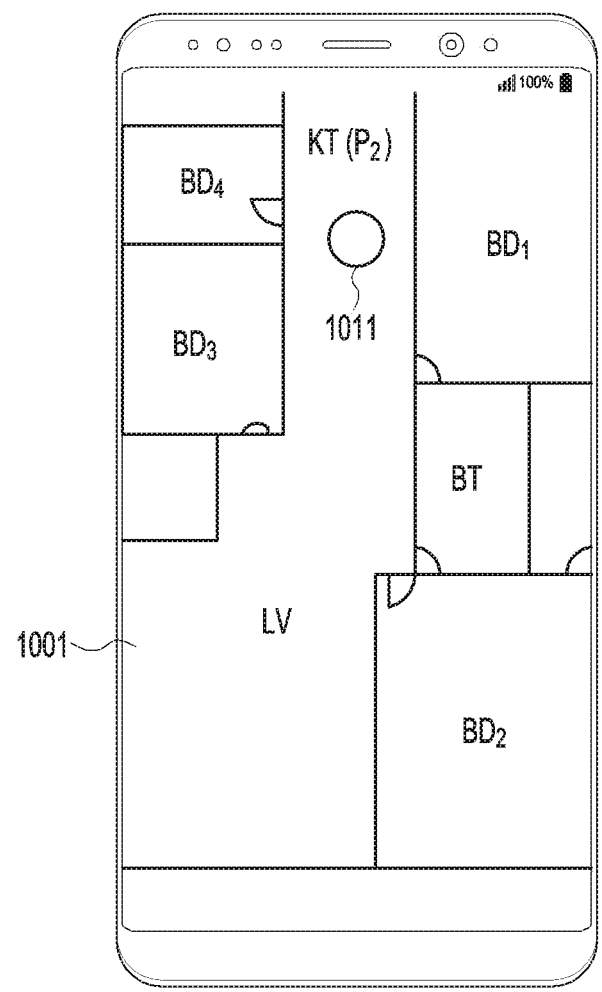
FIG. 10 is a view illustrating an example display screen as per an operation procedure of a first electronic device according to an embodiment of the disclosure.

FIG. 10 is a view illustrating an example display screen as per an operation procedure of a first electronic device according to an embodiment of the disclosure.

Referring to FIG. 10, according to an embodiment, upon generating the reference data, the first electronic device 201 (e.g., the electronic device 101 of FIG. 1 or the first electronic device 810 of FIG. 8) may display, on the screen of a display (e.g., the display 230 of FIG. 2), a map 1001 for a space-of-interest generated using a plurality of set locations. The map 1001 may be generated by the first electronic device 201 or may be generated by the server (e.g., the server 820 of FIG. 8) and received from the server. The first electronic device 201 may display, on the map 1001, the identified final location 1011 which indicates the current location of the first electronic device 201. According to an embodiment, after identifying the final location 1011, the first electronic device 201 may keep on displaying the final location 1011 and, if the location of the electronic device 201 is re-identified, display the identified final location. For example, the first electronic device 201 may display a travel path on the map 1001 based on prior-identified final locations of the first electronic device 201.

According to an embodiment, the first electronic device 201 may perform an operation related to the identified final location and display information related to the operation on the map 1001. For example, if the identified final location 1011 is identified as the kitchen KT (P2), at least one peripheral device (e.g., the electronic device 205 of FIG. 2 or the second electronic device 805 of FIG. 8) located in the kitchen may be, e.g., an IoT refrigerator. The first electronic device 201 or the server may transmit cooking-related information to the display of the refrigerator. Thus, the user of the first electronic device 201 may take advantage of the received cooking-related information.

According to an embodiment, if the signal strength of at least one wireless signal detected in the space-of-interest is lowered to a predetermined level or less, the first electronic device or the server may identify the final location of the first electronic device based on candidate locations identified in the location identifying operation previously performed.

According to an embodiment, second electronic devices (e.g., the second electronic device 205 of FIG. 2 or the second electronic device 805 of FIG. 8) located in the space-of-interest may automatically search for, e.g., user input information via an application for identifying locations and user-set information (e.g., identification information and location information), thereby more accurately identifying the candidate locations or final location or updating the reference data or map for the space-of-interest. According to an embodiment, the first electronic device or the server may receive the map for space-of-interest generated by the second electronic devices (e.g., the second electronic device 205 of FIG. 2 or the second electronic device 805 of FIG. 8).

Each of the aforementioned components of the electronic device may include one or more parts, and a name of the part may vary with a type of the electronic device. The electronic device in accordance with various embodiments of the disclosure may include at least one of the aforementioned components, omit some of them, or include other additional component(s). Some of the components may be combined into an entity, but the entity may perform the same functions as the components may do.

The term 'module' may refer to a unit including one of hardware, software, and firmware, or a combination thereof. The term 'module' may be interchangeably used with a unit, logic, logical block, component, or circuit. The module may be a minimum unit or part of an integrated component. The module may be a minimum unit or part of performing one or more functions. The module may be implemented mechanically or electronically. For example, the module may include at least one of Application Specific Integrated Circuit (ASIC) chips, Field Programmable Gate Arrays (FPGAs), or Programmable Logic Arrays (PLAs) that perform some operations, which have already been known or will be developed in the future.

According to an embodiment of the disclosure, at least a part of the device (e.g., modules or their functions) or method (e.g., operations) may be implemented as instructions stored in a computer-readable storage medium e.g., in the form of a program module. The instructions, when executed by a processor (e.g., the processor 120 of FIG. 1), may enable the processor to carry out a corresponding function. The computer-readable storage medium may be e.g., a memory (e.g., the memory 130 of FIG. 1).

The computer-readable storage medium may include a hardware device, such as hard discs, floppy discs, and magnetic tapes (e.g., a magnetic tape), optical media such as compact disc ROMs (CD-ROMs) and digital versatile discs (DVDs), magneto-optical media such as floptical disks, ROMs, RAMs, flash memories, and/or the like. Examples of the program instructions may include not only machine language codes but also high-level language codes which are executable by various computing means using an interpreter. The aforementioned hardware devices may be configured to operate as one or more software modules to carry out various embodiments of the disclosure, and vice versa.

Modules or programming modules in accordance with various embodiments of the disclosure may include at least one or more of the aforementioned components, omit some of them, or further include other additional components. Operations performed by modules, programming modules or other components in accordance with various embodiments of the disclosure may be carried out sequentially, simultaneously, repeatedly, or heuristically. Furthermore, some of the operations may be performed in a different order, or omitted, or include other additional operation(s).

According to an embodiment, there is provided a computer readable recording medium recording a program running on a computer, the program comprising executable instructions executed by a processor to enable the processor to obtain a plurality of locations in a space-of-interest, detect a wireless signal from at least one external electronic device located in the space-of-interest or an adjacent area, obtain detection frequency data according to a frequency of detection of the wireless signal, identify at least one candidate location among the plurality of locations based on at least part of the obtained detection frequency data, and identify a current location of the electronic device based on the at least one identified candidate location.

According to an embodiment, there is provided computer readable recording medium recording a program running on a computer, the program comprising executable instructions executed by a processor to enable the processor to obtain a plurality of locations in a space-of-interest, receive, from a first electronic device, detection frequency data for a wireless signal received from at least one external electronic device adjacent to the first electronic device, identify a current location of the first electronic device based on at least part of the received detection frequency data, and perform an operation related to the identified current location.

As is apparent from the foregoing description, according to various embodiments, the current location of an electronic device may be identified based on the frequency of detection of wireless signals detected in a space of interest. Thus, the current location of the electronic device may be identified more accurately. The user of the electronic device may be provided a service according to the identified current location of the electronic device and be given useful information suited for the user's location and context.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents

What is claimed is:

1. An electronic device, comprising:
a memory; and
a processor electrically connected with the memory, wherein the processor is configured to:
obtain a plurality of locations in a space,
detect a wireless signal from at least one external electronic device located in the space,
obtain detection count data according to a number of detections of the wireless signal,
identify at least one candidate location among the plurality of locations based on at least part of the detection count data, and
identify a current location of the electronic device based on the at least one candidate location, and
wherein the at least one candidate location is at least one location corresponding to reference data of a ratio same as or similar to a ratio of the detection count data from a database stored in the memory.

2. The electronic device of claim 1, wherein the processor is further configured to identify that at least one location adjacent to a prior-identified location of the electronic device is the at least one candidate location, when the at least one location corresponding to the reference data of the same or similar ratio to the detection count data is not identified.

3. The electronic device of claim 1, wherein the processor is further configured to, when there are a plurality of candidate locations:
identify a similarity between each of the plurality of candidate locations and a wireless communication fingerprint of the electronic device, the wireless communication fingerprint set based on a strength of the wireless signal detected from the at least one external electronic device, and
determine that a candidate location with a highest similarity as identified is the current location.

4. The electronic device of claim 1, wherein the processor is further configured to, when there are a plurality of candidate locations, determine that a midway location of a predetermined area between selected adjacent candidate locations is the current location.

5. The electronic device of claim 1, wherein the processor is further configured to:
identify a plurality of candidate locations among the plurality of locations based on a signal strength of the detected wireless signal, and
identify the current location among the plurality of identified candidate locations based on the detection count data.

6. The electronic device of claim 1, wherein the processor is further configured to:
generate the reference data used for identifying a candidate location in each of the plurality of locations before obtaining the plurality of locations in the space according to a request for identifying the current location of the electronic device,
control the memory to store the generated reference data in a database of the memory, and
when generating the reference data:
set the space and set the plurality of locations to be identified in the set space,
generate a map for the space using the plurality of set locations,
detect the wireless signal from the at least one external electronic device in each of the plurality of locations during a preset time,
obtain the detection count data for the detected wireless signal, and
generate the reference data using the generated map and the obtained detection count data.

7. The electronic device of claim 6, wherein the processor is further configured to:
split the space into preset unit areas,
obtain the detection count data for the wireless signal detected from the at least one external electronic device in each of the preset unit areas, and
differentiate the plurality of locations based on the obtained detection count data.

8. The electronic device of claim 6, wherein the processor is further configured to set space areas divided by a user according to a property of the space as the plurality of locations.

9. The electronic device of claim 6, further comprising a display,
wherein the processor is further configured to:
control the display to display the generated map visually representing the candidate location and the plurality of locations identified in the space,
upon identifying the current location of the electronic device, control the display to display the identified current location on the generated map, and
when the current location is identified, update pre-stored reference data based on the obtained detection count data.

10. A method for identifying a location by an electronic device, the method comprising:
obtaining a plurality of locations in a space;
detecting a wireless signal from at least one external electronic device located in the space;
obtaining detection count data according to a number of detections of the wireless signal;
identifying at least one candidate location among the plurality of locations based on at least part of the detection count data; and
identifying a current location of the electronic device based on the at least one candidate location,
wherein the at least one candidate location is at least one location corresponding to reference data of a ratio same as or similar to a ratio of the detection count data from a database stored in a memory.

11. The method of claim 10, wherein the identifying of the at least one candidate location comprises identifying that at least one location adjacent to a prior-identified location of the electronic device is the at least one candidate location, when the at least one location corresponding to the reference data of the same or similar ratio to the detection count data is not identified.

12. The method of claim 10, wherein the identifying of the current location comprises, when there are a plurality of candidate locations as identified:
identifying a similarity between each of the plurality of candidate locations and a wireless communication fingerprint of the electronic device, the wireless communication fingerprint set based on a strength of the wireless signal detected from the at least one external electronic device; and
determining that a candidate location with a highest similarity as identified is the current location.

13. The method of claim 10, further comprising:
identifying a plurality of candidate locations among the plurality of locations based on a signal strength of the detected wireless signal,
wherein the current location is identified to be one of the plurality of identified candidate locations based on the detection count data.

14. The method of claim 10, further comprising:
generating the reference data used for identifying a candidate location in each of the plurality of locations before obtaining the plurality of locations in the space according to a request for identifying the current location of the electronic device; and
controlling the memory to store the generated reference data in a database of the memory,
wherein the generating of the reference data comprises:
setting the space and the plurality of locations to be identified in the set space,
generating a map for the space using the plurality of set locations,
detecting the wireless signal from the at least one external electronic device in each of the plurality of locations during a preset time,
obtaining the detection count data for the detected wireless signal, and
generating the reference data using the generated map and the obtained detection count data.

15. The method of claim 14, wherein the setting of the plurality of locations comprises:
splitting the space into preset unit areas,
obtaining the detection count data for the wireless signal detected from the at least one external electronic device in each of the preset unit areas, and
differentiating the plurality of locations based on the obtained detection count data.

16. The method of claim 14, wherein the setting of the plurality of locations comprises setting space areas divided by a user according to a property of the space as the plurality of locations.

17. The method of claim 14, further comprising:
controlling a display of the electronic device to display the generated map for the space visually representing the candidate location and the plurality of locations identified in the space; and
upon identifying the current location of the electronic device, controlling the display to display the identified current location on the generated map.

18. A computer readable recording medium recording a program running on a computer of an electronic device, the program comprising executable instructions executed by a processor to enable the processor to:
obtain a plurality of locations in a space;
detect a wireless signal from at least one external electronic device located in the space;
obtain detection count data according to a number of detections of the wireless signal;
identify at least one candidate location among the plurality of locations based on at least part of the detection count data; and
identify a current location of the electronic device based on the at least one candidate location,
wherein the at least one candidate location is at least one location corresponding to reference data of a ratio same as or similar to a ratio of the detection count data from a database stored in a memory.

* * * * *